US012565130B2

(12) United States Patent
Resch et al.

(10) Patent No.: US 12,565,130 B2
(45) Date of Patent: Mar. 3, 2026

(54) VEHICLE SEAT COMPONENT WITH COVER MEMBER

(71) Applicant: LEAR CORPORATION, Southfield, MI (US)

(72) Inventors: Maximilian Resch, Oberding (DE); Matthias Boehm, Oberding (DE)

(73) Assignee: Lear Corporation, Southfield, MI (US)

( * ) Notice: Subject to any disclaimer, the term of this patent is extended or adjusted under 35 U.S.C. 154(b) by 218 days.

(21) Appl. No.: 18/378,734

(22) Filed: Oct. 11, 2023

(65) Prior Publication Data

US 2024/0262269 A1     Aug. 8, 2024

(30) Foreign Application Priority Data

Feb. 7, 2023    (DE) .......................... 102023102899.5

(51) Int. Cl.
B60N 2/28        (2006.01)
B60N 2/58        (2006.01)

(52) U.S. Cl.
CPC ............. B60N 2/58 (2013.01); B60N 2/2887 (2013.01); B60N 2/289 (2013.01); B60N 2/2893 (2013.01); B60N 2/28 (2013.01)

(58) Field of Classification Search
CPC ..... B60N 2/2887; B60N 2/289; B60N 2/2893
See application file for complete search history.

(56) References Cited

U.S. PATENT DOCUMENTS

| | | | |
|---|---|---|---|
| 6,397,440 B1 * | 6/2002 | Sack ................. | A44B 11/2526 |
| | | | 24/647 |
| 6,601,917 B1 | 8/2003 | Christopherson | |
| 7,722,105 B2 * | 5/2010 | Shellhammer ......... | B60R 11/00 |
| | | | 280/801.1 |

(Continued)

FOREIGN PATENT DOCUMENTS

| | | |
|---|---|---|
| CN | 210390868 U | 4/2020 |
| CN | 216580226 U | 5/2022 |

(Continued)

OTHER PUBLICATIONS

German Office Action (with English Machine Translation) Dated Sep. 26, 2023, Application No. 10 2023 102 899.5, Applicant Lear Corporation, 14 Pages.

*Primary Examiner* — Rodney B White
(74) *Attorney, Agent, or Firm* — Brooks Kushman P.C.

(57)        ABSTRACT

A vehicle seat component includes a mounting structure, and a cover member attachable to the mounting structure. When the cover member is attached to the mounting structure, the cover member is movable between a first position for at least partially covering an attachment location configured for attaching an additional device, and a second position for exposing the attachment location. The mounting structure and the cover member are configured so that the cover member is attachable to the mounting structure by moving the cover member relative to the mounting structure in a mounting direction when the cover member is in a mounting orientation relative to the mounting structure. When the (Continued)

cover member is attached to the mounting structure, the cover member is inhibited from detachment from the mounting structure when the cover member is in the first position or the second position.

20 Claims, 4 Drawing Sheets

(56)                    References Cited

U.S. PATENT DOCUMENTS

| | | | | |
|---|---|---|---|---|
| 9,340,128 | B2 * | 5/2016 | Arai | B60N 2/6009 |
| 9,592,750 | B2 * | 3/2017 | Asaeda | B60N 2/289 |
| 9,604,555 | B2 * | 3/2017 | Fujikake | B60N 2/2887 |
| 9,676,304 | B2 * | 6/2017 | del Puerto Camargo | |
| | | | | B60N 2/28 |
| 9,821,686 | B2 * | 11/2017 | Ruthinowski | B60N 2/64 |
| 10,052,980 | B2 * | 8/2018 | Konrad | B60N 2/2893 |
| 10,220,739 | B2 * | 3/2019 | Okuhara | B60N 2/58 |
| 10,239,424 | B2 * | 3/2019 | Terada | B60N 2/70 |
| 10,279,710 | B2 * | 5/2019 | Wieczorek | B60N 2/2893 |
| 10,343,561 | B2 * | 7/2019 | Terada | B60N 2/64 |
| 10,427,560 | B2 * | 10/2019 | Ishizaka | B60N 2/6009 |
| 10,899,279 | B2 * | 1/2021 | Yilma | B60N 2/2809 |
| 10,960,791 | B1 * | 3/2021 | Skinner | B60N 2/2893 |
| 11,007,909 | B2 * | 5/2021 | Styn | B60N 2/6009 |
| 11,046,216 | B2 * | 6/2021 | Parmar | B60N 2/2893 |
| 11,124,096 | B2 * | 9/2021 | Onji | B60N 2/28 |
| 11,560,075 | B2 * | 1/2023 | Parmar | B60N 2/2893 |
| 11,667,220 | B2 * | 6/2023 | Onji | B60N 2/2887 |
| | | | | 297/253 |
| 11,780,354 | B2 * | 10/2023 | Haeussler | B60N 2/6027 |
| | | | | 297/219.1 |
| 12,269,379 | B2 * | 4/2025 | Tomioka | B60N 2/6009 |
| 2021/0046853 | A1 | 2/2021 | Haeussler et al. | |
| 2022/0169160 | A1 * | 6/2022 | Olsson | B60N 2/58 |
| 2025/0178495 | A1 * | 6/2025 | Tomioka | B60N 2/289 |

FOREIGN PATENT DOCUMENTS

| | | |
|---|---|---|
| CN | 218257845 U | 1/2023 |
| DE | 600 00 655 T2 | 6/2003 |
| DE | 10 2016 223 365 A1 | 5/2018 |
| JP | 2013-123978 A | 6/2013 |

* cited by examiner

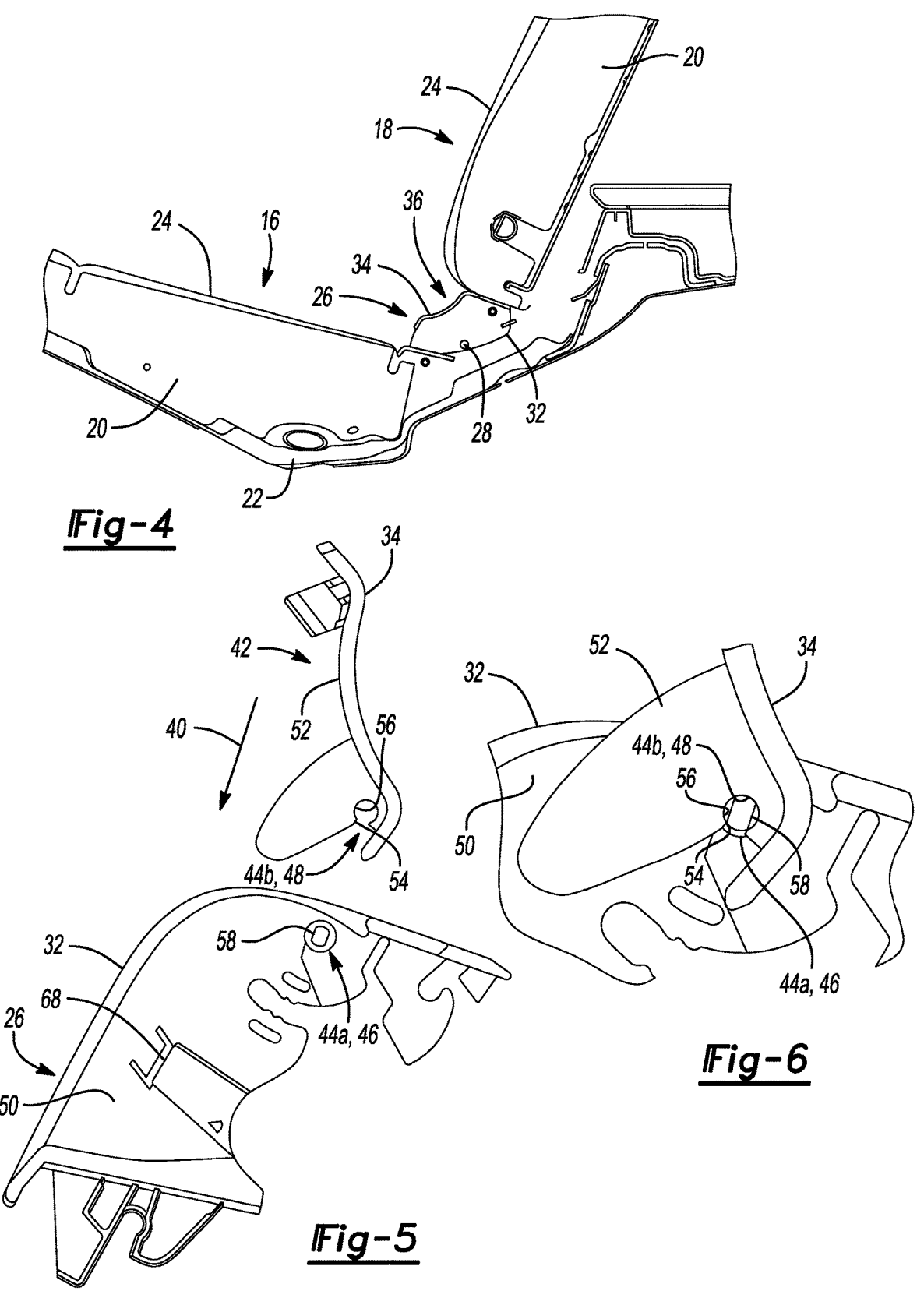
_Fig-4_
_Fig-5_
_Fig-6_

VEHICLE SEAT COMPONENT WITH COVER MEMBER

CROSS-REFERENCE TO RELATED APPLICATIONS

This application claims foreign priority benefits under 35 U.S.C. § 119(a)-(d) to DE application number 10 2023 102 899.5, filed Feb. 7, 2023, which is incorporated by reference in its entirety.

TECHNICAL FIELD

The present disclosure relates to a vehicle seat component with a cover member for covering an attachment location, and a vehicle seat including such a vehicle seat component.

BRIEF DESCRIPTION OF THE DRAWINGS

FIG. 4 is an enlarged side sectional view of a portion of the seat assembly shown in FIG. 3, with the cover member in the first position;

FIG. 5 is a side sectional view of the cover member prior to attachment to a mounting structure of the associated cover member assembly, wherein the cover member is shown in a mounting orientation;

FIG. 6 is an enlarged side sectional view of a portion of the cover member and the mounting structure shown in FIG. 5 after attachment of the cover member to the mounting structure, with the cover member still in the mounting orientation;

DETAILED DESCRIPTION

Figures 1, 2, 3:
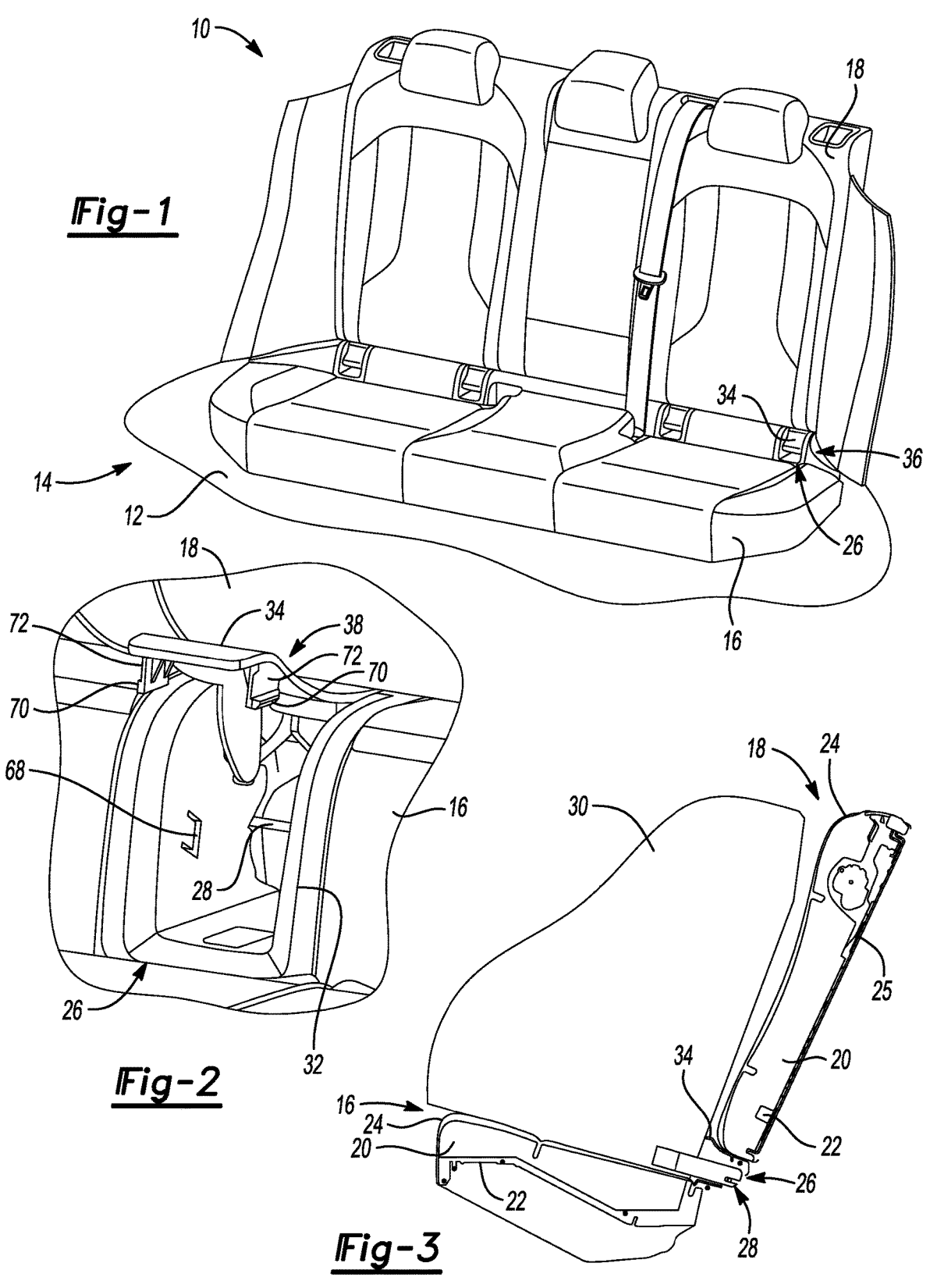
FIG. 1 is a perspective view of a vehicle seat assembly, according to the present disclosure, attached to a vehicle and showing multiple cover member assemblies of the seat assembly that each include a movable cover member shown in a first position for covering or at least partially covering an attachment location, which is configured for attaching an additional device, such as a child seat, to the vehicle.
FIG. 2 is an enlarged perspective view of a portion of a vehicle seat component of the seat assembly, showing one of the cover members in a second position for exposing the associated attachment location.
FIG. 3 is a side sectional view of the seat assembly showing the cover member of FIG. 2 in the second position and an additional device (e.g., a child seat) positioned on the seat assembly and connected to the attachment location.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 shows a vehicle seat or vehicle seat assembly 10, according to the disclosure, mounted to a vehicle body 12 (e.g., floor, side body portion, and/or a support portion attached to the floor and/or side body portion) of a motor vehicle 14. The vehicle seat assembly 10 includes first and second vehicle seat components, such as a seat bottom 16 and a seat back 18 positioned adjacent and above the seat bottom 16. In the illustrated embodiment, the seat bottom 16 and the seat back 18 are each mounted to the vehicle body 12 in any suitable manner, such as with one or more fasteners (e.g., screws, bolts, etc.). Furthermore, in the illustrated embodiment, the seat bottom 16 is a bench-type seat bottom for receiving or accommodating multiple seat occupants, and the seat back 18 includes multiple seat back portions for receiving or accommodating multiple seat occupants. As another example, the seat bottom 16 and seat back 18 may each be configured to accommodate or receive a single seat occupant.

Referring to FIGS. 3 and 4, the seat bottom 16 and seat back 18 each include a cushion 20 made of any suitable material or materials, such as a foam (e.g., polyurethane foam) and/or fibers (e.g., plastic or polymeric strands or fibers, such as polyethylene or polyurethane fibers, formed as a stranded mesh material), a support structure 22, such as a lower seat frame or metal seat pan for the seat bottom 16 and an upper seat frame for the seat back 18, that supports the cushion 20, and a cover material 24, such as fabric, vinyl or leather, that covers the seat cushion 20. The seat back 18 may further include a back panel 25 that covers a back portion of the seat back 18, or the associated cover material 24 may cover the back portion.

In the embodiment shown in FIGS. 1-4, the seat bottom 16 further includes one or more cover member assemblies 26 that are each attached to the associated cushion 20 and/or support structure 22 and configured for covering an attachment location 28, which is configured for attaching an additional device, such as a child seat 30, to the vehicle 14, such as the vehicle body 12. For example, in the embodiment shown in FIGS. 2-4, the attachment location 28 is configured as an ISOFIX attachment fastener, such as an eyelet, clip, wire, etc., that is configured for attachment with the child seat 30, and that attachment location 28 is connected to the vehicle body 12. The child seat 30 may have a locking or fastening device, for example, that is engageable with the attachment location 28.

The vehicle seat assembly 10 shown in FIG. 1 includes four cover member assemblies 26, with one cover member assembly 26 on each side of left and right main seating portions of the vehicle seat assembly 10. One of the cover member assemblies 26 is described below in detail, with the understanding that each cover member assembly 26 may have the same or similar configuration.

Referring to FIGS. 2-4, the illustrated cover member assembly 26 includes a mounting structure 32, such as a support structure or housing, and a cover member 34, such as a flap or cover (e.g., ISOFIX flap or cover), attached to the mounting structure 32. The cover member 34 is made of any suitable material, such as plastic (e.g., polycarbonate or acrylonitrile butadiene styrene (ABS)), and the cover member 34 may be a generally rigid component. Likewise, the mounting structure 32 is made of any suitable material, such as plastic (e.g., polycarbonate or ABS). In addition, in the illustrated embodiment, the mounting structure 32 is formed as a housing that is configured to provide access to the attachment location 28.

When the cover member 34 is attached to the mounting structure 32, the cover member 34 is movable, e.g., rotatable or pivotable about an axis of rotation, relative to the mounting structure 32 between a first position 36, such as a lowered position shown in FIGS. 1 and 4, for covering or at least partially covering the attachment location 28, and a second position 38, such as a raised position shown in FIGS. 2 and 3, for exposing the attachment location 28. Furthermore, when the seat bottom 16 and seat back 18 are mounted to the vehicle 14, the seat back 18 may inhibit removal of the cover member 34 from the mounting structure 32, as explained below in detail.

Referring to FIGS. 5-12, an assembly process or method for assembling the cover member assembly 26 and the associated seat assembly 10 will now be described. Referring to FIG. 5, the mounting structure 32 and the cover member 34 are configured so that the cover member 34 is attachable to the mounting structure 32 by moving the cover member 34 relative to the mounting structure 32 (i.e., the cover member 34 may be moved toward the mounting structure 32 and/or the mounting structure 32 may be moved toward the cover member 34) in a mounting direction 40, e.g., downward direction for the cover member 34 or upward direction for the mounting structure 32 (only the downward mounting direction 40 is shown in FIG. 5), when the cover member 34 is in a mounting orientation 42, e.g., upright orientation, relative to the mounting structure 32, wherein the mounting orientation 42 is different than the first position 36 and the second position 38. After the cover member 34 has been attached to the mounting structure 32, the cover member 34 is detachable from the mounting structure 32 by moving the cover member 34 relative to the mounting structure 32 in a direction opposite the mounting direction 40 when the cover member 34 is in the mounting orientation 42 relative to the mounting structure 32.

In the illustrated embodiment, the mounting structure 32 includes a first attachment feature 44*a*, and the cover member 34 includes a second attachment feature 44*b* that is configured to mate with the first attachment feature 44*a* to attach the cover member 34 to the mounting structure 32. Furthermore, the first and second attachment features 44*a* and 44*b*, respectively, are cooperable to inhibit detachment of the cover member 34 from the mounting structure 32 when the cover member 34 is in the first position 36 and the second position 38. For example, the attachment features 44*a* and 44*b* may cooperate to inhibit detachment of the cover member 34 from the mounting structure 32 when the cover member 34 is in the first position 36, or the second position 36, or any position between the first position 36 and the second position 38 when a removal force, e.g., up to 150 newtons (N), or up to 200 N, or up to 250 N, or of at least 200 N, is applied to the cover member 34.

As a more specific example, the first attachment feature 44*a* of the mounting structure 32 may comprise or define one of a projection 46 (e.g., pin, shaft, etc.) or an aperture 48 (e.g., slot or groove), and the second attachment feature 44*b* of the cover member 34 may comprise or define the other of the projection 46 or the aperture 48. Furthermore, the aperture 48 is configured to receive the projection 46 when the cover member 34 is in the mounting orientation 42 relative to the mounting structure 32, and moved in the mounting direction 40 relative to the mounting structure 32, to attach the cover member 34 to the mounting structure 32. In addition, when the cover member 34 is attached to the mounting structure 32, the projection 46 and the aperture 48 are configured to inhibit removal of the projection 46 from the aperture 48 when the cover member 34 is in the first position 36 and the second position 38.

In the embodiment shown in FIGS. 5-8, the mounting structure 32 is provided with the projection 46, and the cover member 34 is provided with the aperture 48. Specifically, the mounting structure 32 includes a main body 50, and the projection 46 projects laterally (e.g., inwardly) from the main body 50. Likewise, the cover member 34 includes a main body 52, and the aperture 48 is defined in a lower portion, e.g., fin or paddle portion, of the main body 52.

Referring to FIGS. 5 and 6, the aperture 48 comprises an entrance opening 54 and a curved section or portion 56. In that embodiment, a cross-section of the projection 46 comprises at least one straight side 58. Specifically, the cross-section of the projection 46 includes two parallel, straight sides 58, and two arcuate or curved ends 60 that each join the straight sides 58. With such a configuration, the aperture 48 is configured to receive the projection 46 when the cover member 34 is in the mounting orientation 42 relative to the mounting structure 32, so that the cover member 34 may be moved relative to the mounting structure 32 (i.e., the cover member 34 may be moved toward the mounting structure 32 and/or the mounting structure 32 may be moved toward the cover member 34) in the mounting direction 40 to attach the cover member 34 to the mounting structure 32. More specifically, the entrance opening 54 of the aperture 48 is configured to receive the projection 46 (e.g., the straight sides 58 of the projection 46) only when the cover member 34 is in the mounting orientation 42 relative to the mounting structure 32.

Figures 7, 8, 9:
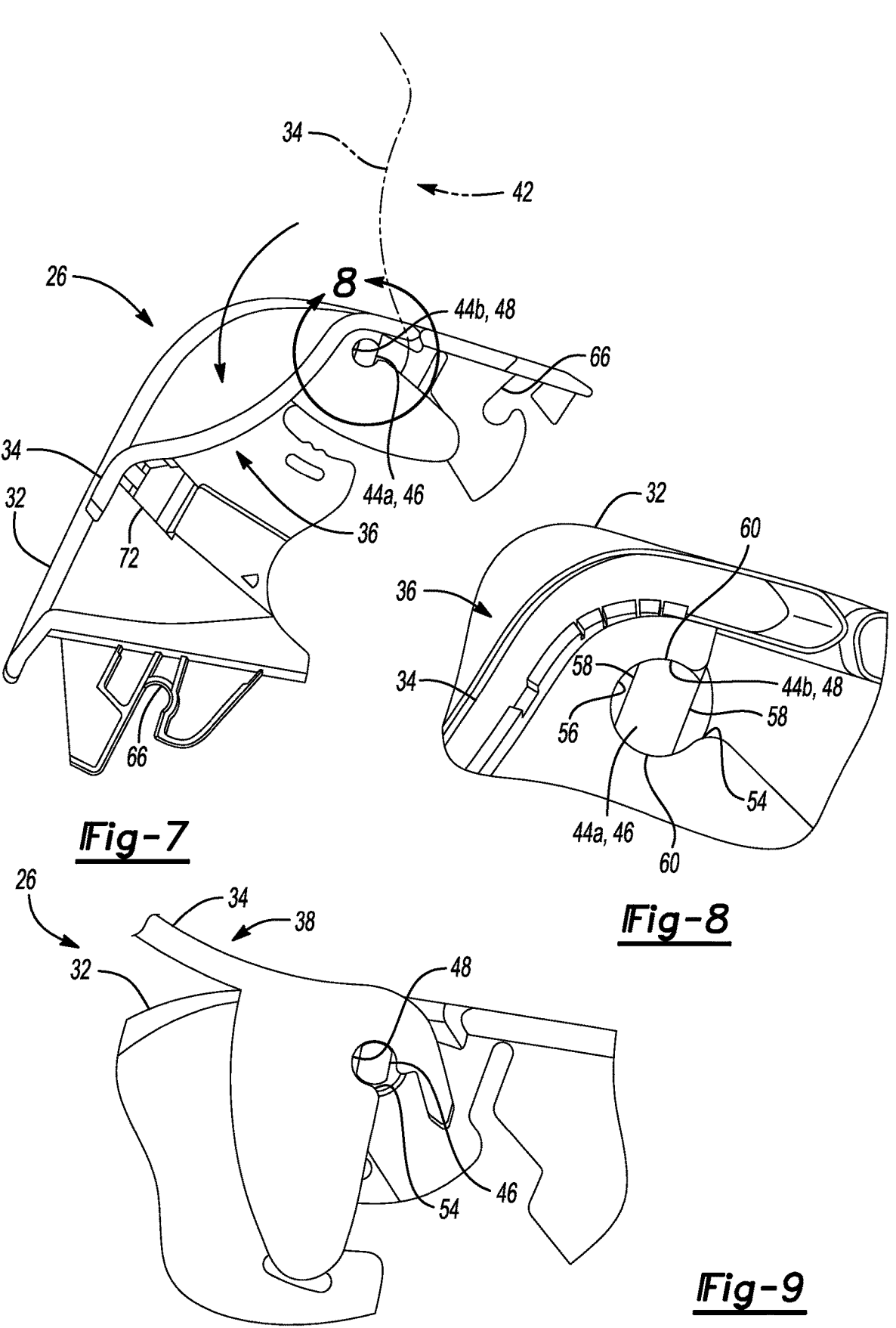
FIG. 7 is a side sectional view of the cover member and the mounting structure, showing the cover member in the first position.
FIG. 8 is an enlarged side sectional view of a portion of the cover member and mounting structure shown in FIG. 7, with the cover member in the first position.
FIG. 9 is an enlarged side sectional view similar to FIG. 8, but showing the cover member in the second position.

Referring to FIGS. 7 and 8, when the cover member 34 is moved (e.g., rotated or pivoted about the projection 46) away from the mounting orientation 42 and toward the first position 36, the projection and aperture configuration (e.g., pin and slot configuration) inhibit removal of the cover member 34 from the mounting structure 32. In that regard, the curved section 56 of the aperture 48 and the curved ends 60 of the projection 46 may facilitate movement (e.g., rotation) of the cover member 34 relative to the mounting structure 32, while the configuration of the projection 46 and the entrance opening 54 of the aperture 48 inhibit detachment of the cover member 34 from the mounting structure 32 when the cover member 34 is not in the mounting orientation 42 relative to the mounting structure 32. Specifically, the projection and aperture configuration (e.g., pin and slot configuration) may inhibit detachment of the cover member 34 from the mounting structure 32 when the cover member 34 is the first position 36 (shown in FIG. 8) and the second position 38 (shown in FIG. 9), or any position between the first and second positions 36 and 38, respectively. Alternatively, the projection 46 and aperture 48 may have any suitable configuration that facilitates attachment of the cover member 34 to the mounting structure 32 when the cover member 34 is in the mounting orientation 42 relative to the mounting structure 32, and that inhibits removal of the cover member 34 from the mounting structure 32 when the cover member 34 is moved away from the mounting orientation 42 (e.g., when the cover member 34 is in the first position 36 or the second position 38, or any position between the first and second positions 36 and 38, respectively).

Before or after the cover member 34 has been attached to the mounting structure 32, the mounting structure 32 may be mounted on the cushion 20 and/or the support structure 22 of the seat bottom 16. In the embodiment shown in FIG. 12, for example, the mounting structure 32 is fastened to one or more support members 64, such as wires, that are connected to and/or supported by the support structure 22. Specifically, the mounting structure 32 includes one or more openings 66, e.g., grooves or notches, that are engageable with, or otherwise configured to receive, the support members 64. As another example, the mounting structure 32 may be connected to the cushion 20 and/or the support structure 22 of the seat bottom 16 in any suitable manner, such as with one or more fasteners (e.g., bolts or screws), that connect the mounting structure 32 to the cushion 22 and/or the support structure 22, or to a component connected to the support structure 22.

After the cover member 34 has been mounted on the mounting structure 32, and before or after the mounting structure 32 has been mounted on the cushion 20 and/or the support structure 22 of the seat bottom 16, the assembly process further involves moving, e.g., rotating or pivoting, the cover member 34 relative to the mounting structure 32 from the mounting orientation 42 toward the first position 36, as shown in FIG. 7. The mounting structure 32 and the cover member 34 may also have one or more retaining features that are configured to retain or hold the cover member 34 in the first position 36. In the embodiment shown in FIGS. 2, 5, 10 and 11, for example, the mounting structure 32 includes one or more openings 68, such as channels, grooves or notches, that each receive (e.g., with a friction fit or snap fit) a projection 70 of the cover member 34, such as a laterally extending rib formed on a tab 72 that extends from the main body 52 of the cover member 34, when the cover member 34 is in the first position 36.

The assembly process also involves positioning the seat bottom 16 relative to the seat back 18 so that the seat back 18 is positioned adjacent to the seat bottom 16 and so that the cover member 34 is inhibited from moving, e.g., rotating, back to the mounting orientation 42 by the seat back 18. For example, referring to FIG. 12, the seat bottom 16 including the cover member assembly 26 may be mounted on the vehicle body 12 with the cover member 34 moved away from the mounting orientation 42, and then the seat back 18 may be mounted on the vehicle body 12 adjacent, e.g., directly above, the seat bottom 16. As another example, the seat back 18 may be first mounted to the vehicle body 12, and then the seat bottom 16 may be positioned adjacent, e.g. directly below, the seat back 18. In any case, with the seat back 18 positioned adjacent the seat bottom 16, the seat back 18 may inhibit movement of the cover member 34 back to the mounting orientation 42. As a result, the cover member 34 is movable (e.g., rotatable or pivotable about the projection 46) during use between the first and second positions 36 and 38, respectively, but is inhibited from detachment from the mounting structure 32 because the cover member 34 is unable to reach the mounting orientation 42, which is needed in order to remove the cover member 34 from the mounting structure 32.

Returning to FIGS. 10 and 11, the mounting structure 32 may include two first attachment features 44a, such as projections 46, disposed on opposite sides of the mounting structure 32, and the cover member 34 may include two second attachment features 44b, such as apertures 48, disposed on opposite sides of the cover member 34, wherein each second attachment features 44b is configured to mate with one of the first attachment features 44a for attaching the cover member 34 to the mounting structure 32. Furthermore, the first attachment features 44a and/or the second attachment features 44b may be configured to inhibit lateral movement of the cover member 34 when the cover member 34 is attached to the mounting structure 32. In the embodiment shown in FIG. 11, for example, the first attachment features 44a are each formed as a projection 46 having a main body and an enlarged head 74 that is larger than a diameter of the corresponding aperture 48 that receives the maid body.

Figures 10, 11, 12:
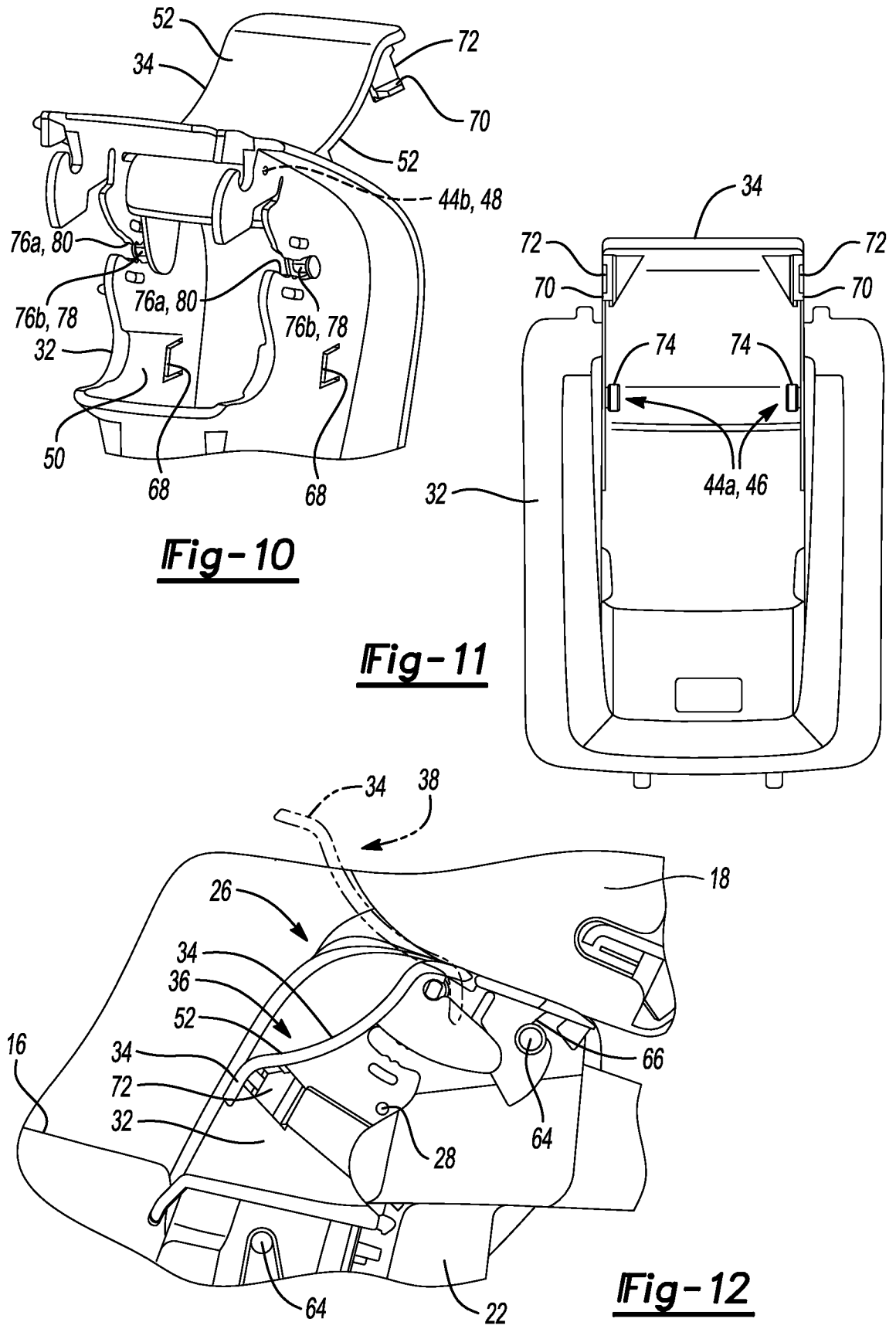
FIG. 10 is a rear perspective view of the cover member and mounting structure, with the cover member in the second position.
FIG. 11 is a front view of the cover member and mounting structure, with the cover member in the second position.
FIG. 12 is a side sectional view of the cover member and mounting structure mounted on a seat component, such as a seat bottom, of the seat assembly, and an additional seat component, such as a seat back, positioned adjacent the cover member and mounting structure.

Referring to FIG. 10, the mounting structure 32 may also include one or more first guide and/or retention features 76a that are each cooperable with a corresponding second guide and/or retention feature 76b formed in or on the cover member 34 to guide the cover member 34 as the cover member 34 moves between the first and second positions 36 and 38, respectively, and/or to retain the cover member 34 in the second position 38 or other position(s). As a more specific example, each first guide and/or retention feature 76a of the mounting structure 32 may comprise or define one of a projection 78 (e.g., pin, shaft, etc.) or an aperture 80 (e.g., slot or groove), and each second guide and/or retention feature 76b of the cover member 34 may comprise or define the other of the projection 78 or the aperture 80. In the embodiment shown in FIG. 10, the mounting structure 32 includes two apertures 80, one aperture 80 formed on each side of the main body 50 of the mounting structure 32, and the cover member 34 includes two projections 78 that each project laterally outwardly from the main body 52 of the cover member 34. Each projection 78 is movable along a respective aperture 80 as the cover member 34 moves between the first and second positions 36 and 38, respectively. Furthermore, the projections 78 and apertures 80 may guide movement of the cover member 34 between the first and second positions 36 and 38, respectively, and/or the projections 78 may cooperate with the apertures 80 to hold or support the cover member 34 in the second position 38 and/or in one or more positions between the second position 38 and the first position 36. For example, each projection 78 may be engageable with one or more retention features (e.g., ridges), which are formed in the main body 50 of the mounting structure 32 along a corresponding aperture 80, to hold the cover member 34 in the second position 38 and/or one or more positions between the first position 36 and the second position 38.

In another embodiment, the cover member assembly 26 may be attached to the seat back 18 instead of, or in addition to, the seat bottom 16. For example, the mounting structure 32 may be attached to one or more support members, such as wires, that are connected to the cushion 20 and/or the support structure 22 of the seat back 18, e.g., at a lower end of the seat back 18.

In any of the above described embodiments, the mounting structure 32 may instead be provided with one or more first attachment features that are each formed as an aperture (e.g., a slot or groove), and the cover member 34 may be provided with one or more second attachment features that are each formed as a projection (e.g., pin, shaft, etc.) configured to be received in one of the apertures of the mounting structure 32 to attach the cover member 34 to the mounting structure 32. Furthermore, in a similar manner as described above, the one or more first attachment features and the one or more second attachment features may be configured to enable attachment of the cover member 34 to the mounting structure 32 only when the cover member 34 is in the mounting orientation 42 relative to the mounting structure 32, and moved relative to the mounting structure 32 in the mounting direction 40. In addition, and in a similar manner as described above, the one or more first attachment features and the one or more second attachment features may be cooperable to inhibit detachment of the cover member 34 from the mounting structure 32 when the cover member 34 is in the first position 36 and the second position 38, or any position between the first and second positions 36 and 38, respectively.

The following clauses describe aspects of embodiments according to the disclosure.

Clause 1. A vehicle seat component comprising a mounting structure, and a cover member attachable to the mounting structure. When the cover member is attached to the mounting structure, the cover member is movable between a first position for at least partially covering an attachment location configured for attaching an additional device, and a second position for exposing the attachment location. The mounting structure and the cover member are configured so that the cover member is attachable to the mounting structure by moving the cover member relative to the mounting structure in a mounting direction when the cover member is in a mounting orientation relative to the mounting structure, wherein the mounting orientation is different than the first position and the second position. When the cover member is attached to the mounting structure, the cover member is inhibited from detachment from the mounting structure when the cover member is in the first position or the second position.

Clause 2. The vehicle seat component of the preceding clause, wherein the cover member is detachable from the mounting structure by moving the cover member relative to the mounting structure in a direction opposite the mounting direction when the cover member is in the mounting orientation relative to the mounting structure.

Clause 3. The vehicle seat component of any of the preceding clauses, wherein the mounting structure comprises a housing configured to provide access to the attachment location.

Clause 4. The vehicle seat component of any of the preceding clauses, wherein the mounting structure comprises a first attachment feature, and the cover member comprises a second attachment feature that is configured to mate with the first attachment feature to attach the cover member to the mounting structure. The first and second attachment features are cooperable to inhibit detachment of the cover member from the mounting structure when the cover member is in the first position and the second position.

Clause 5. The vehicle seat component of any of the preceding clauses, wherein the mounting structure comprises a first retention feature, and the cover member comprises a second retention feature that is cooperable with the first retention feature to retain the cover member in the second position.

Clause 6. The vehicle seat component of any of the preceding clauses, wherein the mounting structure comprises one of a projection or an aperture, and the cover member comprises the other of the projection or the aperture. Furthermore, the aperture is configured to receive the projection when the cover member is in the mounting orientation relative to the mounting structure to attach the cover member to the mounting structure.

Clause 7. The vehicle seat component of clause 6 wherein, when the cover member is attached to the mounting structure, the projection and the aperture are configured to inhibit removal of the projection from the aperture when the cover member is in the first position and the second position.

Clause 8. The vehicle seat component of any of clauses 6 or 7, wherein the aperture comprises a curved section.

Clause 9. The vehicle seat component of any of clauses 6, 7, or 8, wherein a cross-section of the projection comprises at least one straight side.

Clause 10. The vehicle seat component of clause 9, wherein the at least one straight side comprises two parallel straight sides.

Clause 11. The vehicle seat component of any of the preceding clauses, wherein the vehicle seat component is configured as a seat bottom.

Clause 12. A vehicle seat assembly comprising the vehicle seat component of any of the preceding clauses.

Clause 13. The vehicle seat assembly of clause 12, wherein the vehicle seat component is configured as a seat bottom, and the vehicle seat further comprises a seat back associated with the seat bottom.

Clause 14. The vehicle seat assembly of clause 13 wherein, when the cover member is attached to the mounting structure and the seat back is positioned adjacent the seat bottom, the seat back is configured to prevent movement of the cover member to the mounting orientation relative to the mounting structure.

Clause 15. A method of assembling a vehicle seat assembly, the method comprising mounting a cover member on a mounting structure by moving the cover member relative to the mounting structure in a mounting direction while the cover member is oriented in a mounting orientation relative to the mounting structure; mounting the mounting structure on a seat bottom; after the cover member is mounted on the mounting structure, moving the cover member relative to the mounting structure from the mounting orientation toward a first position, in which the cover member is configured to at least partially cover an attachment location for attaching an additional device; and positioning the seat bottom relative to a seat back so that the seat back is positioned adjacent to the seat bottom and so that the cover member is inhibited from moving to the mounting orientation by the seat back.

Clause 16. The method of clause 15, wherein mounting the mounting structure on the seat bottom is performed after mounting the cover member on the mounting structure.

Clause 17. The method of clause 15 or 16, wherein, when the cover member is mounted on the mounting structure and the seat back is positioned adjacent to the seat back, the cover member is movable between the first position and a second position for exposing the attachment location.

Clause 18. The method of any of clauses 15-17, wherein positioning the seat bottom relative to the seat back comprises mounting the seat bottom on a vehicle body so that the seat bottom is positioned below the seat back.

Clause 19. The method of any of clauses 15-18, wherein positioning the seat bottom relative to the seat back comprises mounting the seat back on a vehicle body so that the seat back is positioned above the seat bottom.

Clause 20. The method of any of clauses 15-19, wherein the mounting structure includes a first attachment feature, and the cover member includes a second attachment feature that is configured to mate with the first attachment feature to attach the cover member to the mounting structure, and wherein the first and second attachment features are cooperable to inhibit detachment of the cover member from the mounting structure when the cover member is in the first position and the second position.

Clause 21. A method of assembling a vehicle seat assembly, the method comprising: mounting a cover member on a mounting structure by moving the cover member toward the mounting structure and/or moving the mounting structure toward the cover member while the cover member is oriented in a mounting orientation relative to the mounting structure; wherein, when the cover member is mounted on the mounting structure and the vehicle seat assembly is assembled, the cover member is movable between a first position for at least partially covering an attachment location configured for attaching an additional device, and a second position for exposing the attachment location, wherein the first position and the second position are different than the mounting orientation, and wherein the cover member is inhibited from detachment from the mounting structure when the cover member is in the first position or the second position.

Clause 22. Any of the preceding clauses 1-21 in any combination.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure. In that regard, any features from one embodiment may be combined with any features of another embodiment to form a further embodiment according to the disclosure.

What is claimed is:

1. A vehicle seat component, comprising:
a mounting structure comprising a first retention feature; and
a cover member comprising a second retention feature, the cover member is attachable to the mounting structure and the cover member is movable into any of a first position, a second position, and a mounting orientation position, wherein the mounting orientation position is different than the first position and the second position, and wherein in the mounting orientation position, the first retention feature cooperates with the second retention feature to facilitate one of: disengagement or engagement of the cover member with the mounting structure.

2. The vehicle seat component of claim 1, wherein the cover member is attachable to the mounting structure by moving the cover member relative to the mounting structure in a mounting direction when the cover member is in the mounting orientation position relative to the mounting structure, and
the cover member is detachable from the mounting structure by moving the cover member relative to the mounting structure in a direction opposite the mounting direction when the cover member is in the mounting orientation position relative to the mounting structure.

3. The vehicle seat component of claim 1, wherein the mounting structure comprises a housing configured to provide access to the attachment location.

4. The vehicle seat component of claim 1, wherein the second retention feature that is cooperable with the first retention feature to retain the cover member in the second position.

5. The vehicle seat component of claim 1, wherein the first retention feature of the mounting structure is a projection and the second retention feature of the cover member is an aperture, and wherein the aperture of the cover member is configured to receive the projection of the mounting structure.

6. The vehicle seat component of claim 5, wherein the projection comprises a main body and an enlarged head, wherein the main body is configured to be received in the aperture and a diameter of the enlarged head is greater than a diameter of the aperture.

7. The vehicle seat component of claim 5, wherein, when the cover member is attached to the mounting structure, the projection and the aperture are configured to inhibit removal of the projection from the aperture when the cover member is in the first position and the second position.

8. The vehicle seat component of claim 5, wherein a cross-section of the projection comprises at least one straight side.

9. The vehicle seat component of claim 8, wherein the at least one straight side comprises two parallel straight sides.

10. The vehicle seat component of claim 9, the cross-section of the projection comprises two curved ends which join the two parallel straight sides.

11. The vehicle seat assembly of claim 1, wherein the vehicle seat component is configured as a seat bottom, and the vehicle seat further comprises a seat back associated with the seat bottom.

12. The vehicle seat assembly of claim 11, wherein, when the cover member is attached to the mounting structure and the seat back is positioned adjacent the seat bottom, the seat back is configured to prevent movement of the cover member to the mounting orientation position relative to the mounting structure.

13. The vehicle seat component of claim 1, wherein, the cover member is configured to move to the first position to at least partially cover an attachment location configured for attaching an additional device, and to the second position for exposing the attachment location.

14. A method of assembling a vehicle seat assembly, the method comprising:

mounting a cover member on a mounting structure such that the cover member is movable into any of a first position, a second position, and a mounting orientation position, wherein the mounting orientation position is different than any of the first position and the second position, and wherein in the mounting orientation position, the first retention feature cooperates with the second retention feature to facilitate one of: disengagement or engagement of the cover member with the mounting structure;

mounting the mounting structure on a seat bottom; and positioning the seat bottom relative to a seat back so that the seat back is positioned adjacent to the seat bottom and so that the cover member is inhibited from moving to the mounting orientation position by the seat back.

15. The method of claim 14, wherein mounting the mounting structure on the seat bottom is performed after mounting the cover member on the mounting structure.

16. The method of claim 14, wherein, when the cover member is mounted on the mounting structure and the seat back is positioned adjacent to the seat back, attachment location.

17. The method of claim 14, wherein positioning the seat bottom relative to the seat back comprises mounting the seat bottom on a vehicle body so that the seat bottom is positioned below the seat back.

18. The method of claim 14, wherein positioning the seat bottom relative to the seat back comprises mounting the seat back on a vehicle body so that the seat back is positioned above the seat bottom.

19. The method of claim 14, wherein the mounting structure includes a first retention feature, and the cover member includes a second retention feature that is configured to mate with the first retention feature to attach the cover member to the mounting structure, and wherein the first retention feature and the second attachment feature are cooperable to inhibit detachment of the cover member from the mounting structure when the cover member is in the first position and the second position.

20. A method of assembling a vehicle seat assembly, the method comprising:

mounting a cover member on a mounting structure by moving the cover member toward the mounting structure and/or moving the mounting structure towards the cover member, wherein the cover member is movable into any of a first position, a second position, and a mounting orientation position, wherein the mounting orientation position is different than any of the first position and the second position, and wherein in the mounting orientation position, the first retention feature cooperates with the second retention feature to facilitate one of: disengagement or engagement of the cover member with the mounting structure.

* * * * *